INVENTOR.
WALTER F. KOSONOCKY
BY
ATTORNEY

INVENTOR.
WALTER F. KOSONOCKY
BY [signature]
ATTORNEY

INVENTOR.
WALTER F. KOSONOCKY
BY
ATTORNEY

INVENTOR.
WALTER F. KOSONOCKY
BY [signature]
ATTORNEY 3,458,733
HYBRID TRANSISTOR-NEGATIVE RESISTANCE DIODE CIRCUITS INCLUDING FEEDBACK Walter F. Kosonocky, Iselin, N.J., assignor to Radio Corporation of America, a corporation of Delaware
Filed Apr. 20, 1961, Ser. No. 104,392
Int. Cl. H03k 3/315; H03b 7/08, 7/14
U.S. Cl. 307—286 16 Claims The present invention relates to digital and wave generating circuits which can operate monostably, bistably, or astably.

The circuit of the invention includes a transistor and a negative resistance diode of the voltage controlled type such as a tunnel diode. The negative resistance diode is connected in shunt across the emitter-to-base diode of the transistor in a sense to maintain the transistor cut-off when the negative resistance diode is in its low (low voltage) state and to drive the transistor into conduction when the negative resistance diode is in its high (high voltage) state. A feedback circuit connects one of the emitter and collector electrodes of the transistor to the negative resistance diode and applies a feedback signal to the negative resistance diode. The polarity of the feedback signal is such as to switch the negative resistance diode to its low voltage state when the transistor is driven into conduction.

The feedback circuit may be a delay means which includes a distributed element such as a delay line or a lumped energy storage element such as an inductor or capacitor. For example, in the case of collector feedback, a series inductance may be employed to delay the current fed back to the negative resistance diode. In the case of emitter feedback, the feedback circuit may include an impedance such as a resistor in series with the emitter for developing a feedback voltage. Here, a capacitor in shunt with the resistor may be employed to delay the build-up time of the feedback voltage.

The invention is described in greater detail below and is illustrated in the following drawing of which:

Figure 1:
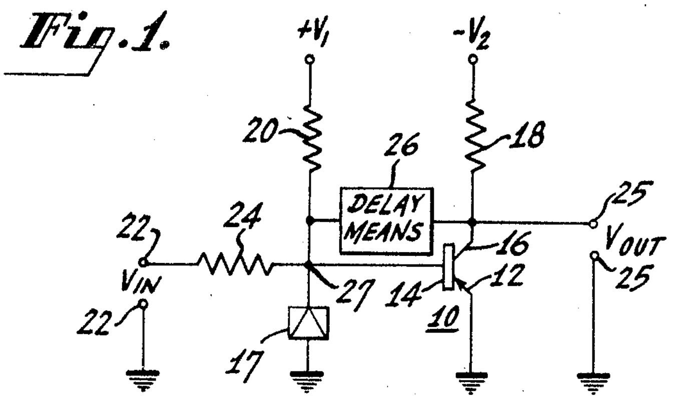
FIG. 1 is a schematic circuit diagram of one embodiment of the invention.

The circuit of FIG. 1 includes a transistor 10 having emitter 12, base 14 and collector 16 electrodes. A voltage controlled negative resistance diode 17 of the tunnel diode type is connected in shunt across the base-to-emitter diode of the transistor. A source $-V_2$ supplies an operating voltage to the collector 16 of the transistor through load resistor 18. A source $+V_1$ supplies a reverse bias voltage to the cathode of the tunnel diode 17 through load resistor 20. An input signal $V_{in}$ may be applied from terminals 22 through resistor 24 to the base 14 of the transistor. The output $V_{out}$ may be taken from the collector 16 at terminals 25.

Figure 5:
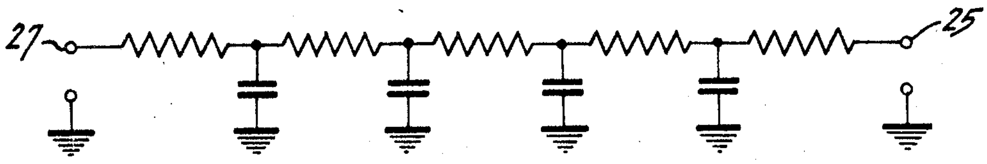
FIGS. 5 and 6 are schematic circuit diagrams of various types of feedback circuits which may be employed in the circuit of FIG. 1.
Figure 6:
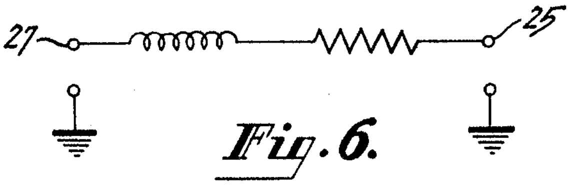

An important feature of the circuit of FIG. 1 is the feedback from collector 16 to the tunnel diode 17. The feedback circuit comprises a delay means 26. The feedback circuit may be of the lumped or distributed type. A circuit employing resistor and capacitor elements is shown in FIG. 5 and a circuit employing a resistor and inductor in series is shown in FIG. 6. In each case, the feedback circuit includes resistor element or elements for controlling the magnitude of the direct current feedback and reactive element or elements for controlling the amount of delay imparted to the signal fed back. The terminals of the feedback circuits are legended to correspond to FIG. 1.

The circuits shown in FIGS. 5 and 6 are both direct current circuits (there is a direct current path from 25 to 27) and can be employed in arrangements which are suitable for monostable, bistable or astable operation. It is also possible to employ an alternating current feedback path (not shown). This may include one or more capacitors shunting a portion of the resistance in the circuits of FIGS. 5 and 6. These alternating current feedback circuits are useful mainly in circuits which operate astably.

Figure 2:
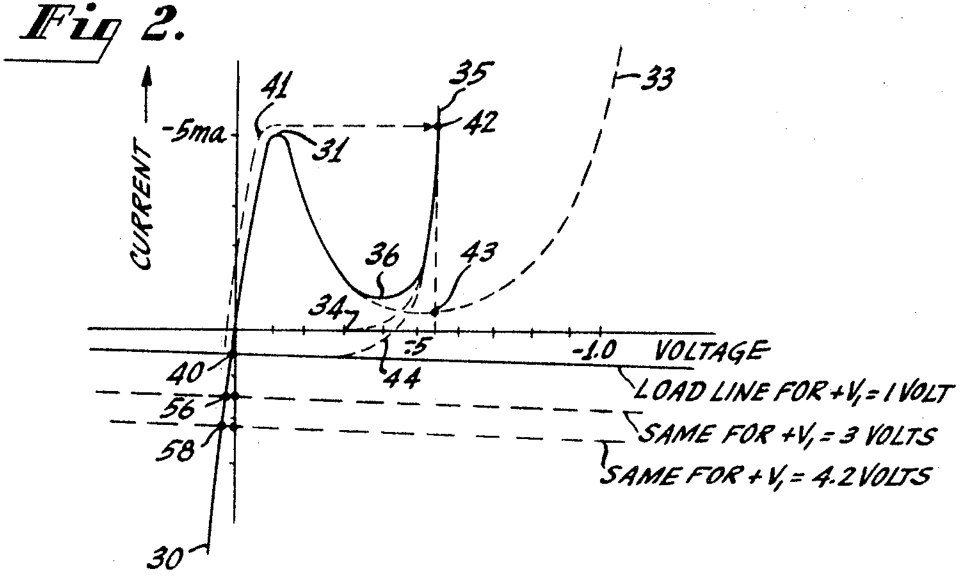
FIG. 2 is a characteristic of current versus voltage to help explain the operation of the circuit of FIG. 1.

The operation of the circuit of FIG. 1 may be better understood by referring to FIG. 2. Curve 30, 31, 43, 33 is a characteristic curve of current versus voltage for a tunnel diode such as 17. The particular tunnel diode for which the curve is drawn is one made of gallium arsenide which has a current peak of about 5 milliamperes. However, it is to be understood that the circuit of FIG. 1 is operative with tunnel diodes of other types such as germanium, silicon or the like.

The characteristic curve of current versus voltage looking into the base 14 of transistor 10 is shown at 34, 35. As the tunnel diode and the base-to-emitter diode are in parallel, the composite characteristic of the two elements looking from terminal 27 toward ground may be obtained by adding the characteristic curves for each in the direction of the current axis. This composite is shown by solid line 30, 31, 36, 35.

The operation of the circuit as an astable, that is, a free-running rectangular wave generator will be described first. When so operating, no input signal need be applied to terminals 22. Accordingly, resistor 24 can be removed from the circuit or, if desired, a resistor having a value of 50 or a hundred ohms or more may be connected between terminals 22.

Assume that initially no voltages are applied to the circuit. The tunnel diode in this case has zero current passing through it and the transistor 10 is cut-off. When the voltages $+V_1$ and $-V_2$ are applied, the tunnel diode 17 is initially reverse biased by the source $+V_1$. Resistor 20 is of relatively large value and the source and resistor together can be considered as a constant current source. The constant current load line when the voltage $V_1$ is one volt is shown by solid line 38 in FIG. 2. (Other circuit values are given later.)

The intersection 40 of the load line 38 and curve 30, 31, 36, 35 is the circuit operating point. The voltage across the tunnel diode is low and, since the tunnel diode is connected across the emitter-to-base diode of the transistor, the transistor remains cut-off.

The voltage $-V_2$ is in a proper polarity to forward bias the tunnel diode 17. After a time equal to the delay imparted by the delay means 26, the current due to source $-V_2$ passes through the delay line and is applied in the forward direction to the tunnel diode. The effect of this current is to move the circuit operating point from 40 in the direction of current peak 31. The voltage $-V_2$ is of sufficient amplitude to cause the current through the diode to exceed the current peak 31. When this occurs, after a time determined by the delay in delay means 26, the tunnel diode switches to its high voltage state. The operating point moves from 40 in the direction of dash line 41 to 42.

When the tunnel diode switches to its high voltage state, the emitter-to-base voltage of the transistor is such as to drive the transistor into conduction. As can be seen from the characteristic curve, relatively high current passes into the transistor and relatively low current passes into the tunnel diode when the tunnel diode is in its high state. The current passing into the tunnel diode is that current available at operating point 43 in FIG. 2.

When the transistor 10 is driven into heavy conduction, the voltage at the collector 16 increases from its former negative value to a value close to ground. This positive going voltage is fed back through delay means 26 to the cathode of the tunnel diode and acts, after a time determined by the delay in delay means 26, to switch the tunnel diode from its high voltage state back to its low voltage state. Referring to FIG. 2, the circuit operating point moves from 42 along some path such as dashed line 44 to 40.

When the tunnel diode switches to its low voltage state, the emitter-to-base voltage of the tunnel diode decreases to a value below that which will sustain conduction through the transistor and the transistor is cut off. The process above continues in the manner already described and continuous nearly rectangular wave oscillations are produced at output terminals 25.

A practical circuit according to FIG. 1 may have the following circuit parameters. These are merely illustrative and are not meant to be limiting.

Resistor 20—1,800 ohms
Resistor 18—500 ohms
Resistor 24—1,000 ohms (this resistor is not needed for astable operation but is used when the circuit is operated monostably or bistably)
Tunnel Diode 17—gallium arsenide with 5 milliampere peak
Transistor 10—PNP Type No. 6F40025

Figure 3:
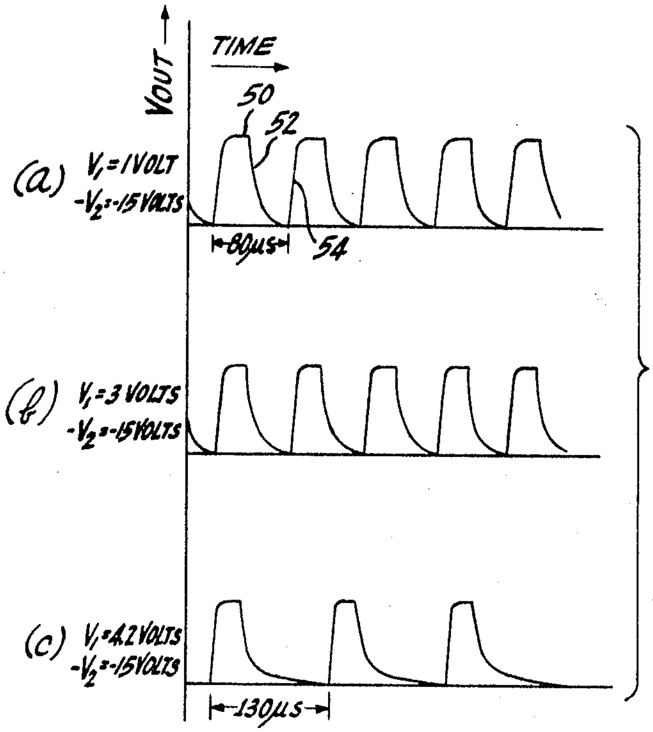
FIG. 3 shows the output available from the circuit of FIG. 1 under different operating conditions when the circuit operates astably.

The operation of the circuit above as an astable oscillator is illustrated in FIG. 3. When the voltage $V_1$ is eqaul to 1 volt and $-V_2$ equals $-15$ volts, the wave shown in FIG. 3*a* is obtained. The circuit employed the resistor-capacitor delay line shown in FIG. 5. The flat top portion 50 of the wave corresponds to heavy conduction through the transistor. The lagging edge 52 corresponds to the switching of the tunnel diode to its low state and the corresponding driving of the transistor 10 to cut off. The slope in the lagging edge appears to be due to the longer time constant associated with the transition of the transistor to its cut-off condition. The leading edge 54 corresponds to the switching of the tunnel diode to its high state and the corresponding start of heavy conduction through the transistor 10.

If the voltage $-V_2$ is maintained at $-15$ volts and the voltage $V_1$ is increased to $+3$ volts, the initial circuit operating point is at 56 in FIG. 2. The shape of the square wave produced is changed to a shape such as that illustrated in FIG. 3*b*. A further increase in the voltage $V_1$ to 4.2 volts results in a change in the initial operating point to 58 in FIG. 2. The square wave produced under these conditions is shown in FIG. 3*c*. As can be seen in these figures, as the reverse bias voltage initially applied to the tunnel diode is increased, the circuit output frequency tends to decrease. This is to be expected as the time required to go from the initial operating point to the tunnel diode peak 31 is increased.

If the voltage $+V_1$ is increased to a value equal to or greater than $+4.5$ volts and the voltage $-V_2$ is maintained at $-15$ volts, it is found that the circuit is no longer astable. However, this circuit can be operated as a monostable circuit if an input pulse of sufficient amplitude is applied to input terminals 22.

Figure 4:
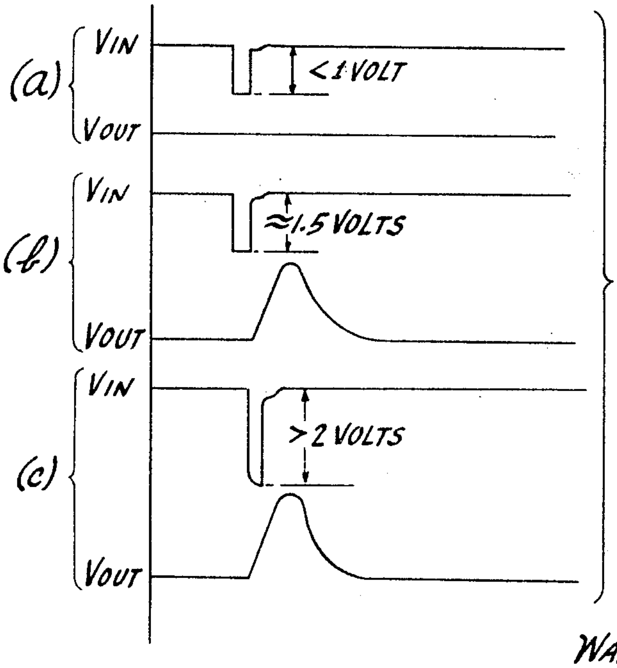
FIG. 4 is a drawing of the output available from the circuit of FIG. 1 under different operating conditions when the circuit is operating monostably.

FIG. 4 illustrates outputs of the circuit operated monostably. The voltages $-V_2$ is $-15$ volts and the voltage $+V_1$ is 4.5 volts. With a small input signal applied to input terminals 22 no output is produced in the circuit. This is illustrated in FIG. 4*a*—the input signal amplitude being somewhat less than a volt. With an input signal of 1.5 volts applied to terminals 22, a monostable output pulse is produced. This is shown in FIGS. 4*b* and *c*. The output pulse amplitude appears to be independent of the input pulse amplitude provided the latter is greater than the threshold value. The output pulse shape also appears to be independent of the input pulse amplitude or duration provided the duration is smaller than a given value (smaller than the delay imparted by line 26).

The circuit of FIG. 1 can be operated as a gated oscillator. In this mode of operation, an input pulse can be applied either to the input terminals or to the one terminal receiving $+V_1$ at an amplitude to cause the circuit to continuously oscillate during the pulse interval. In a similar manner, the circuit of FIG. 9, to be discussed in more detail later, can operate as a gated oscillator.

The output frequency of the circuit of FIG. 1 may be varied in a number of ways. For example, the delay line 26 affects the operating frequency and variation of its delay will control the output frequency. Accordingly, this delay line may be made adjustable rather than fixed. Similarly, as already explained or implied, variation of the voltage $V_1$ or $-V_2$ will affect the output frequency. Similarly, the values of resistors 18 and 20 affect the output frequency. Accordingly, they can be made adjustable rather than fixed as shown.

Figure 7:
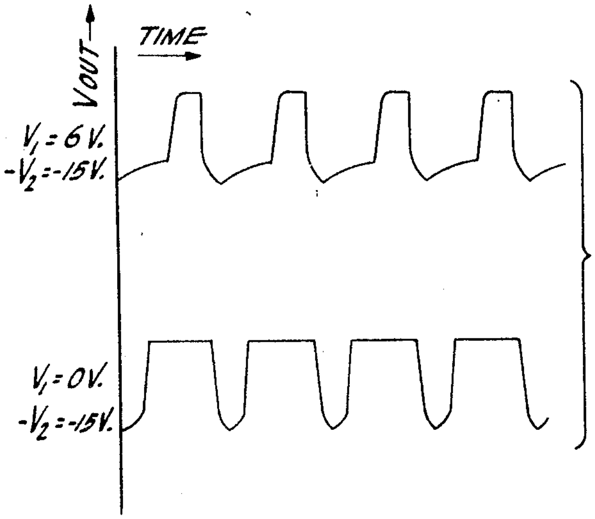
FIG. 7 is a drawing of the output obtained from the circuit of FIG. 1 employing the delay line of FIG. 6.

If a resistor-inductor delay line such as shown in FIG. 6 is employed in the circuit of FIG. 1, a somewhat different type of square wave output is obtained. Typical waves are shown in FIG. 7. Their somewhat steeper lagging edges than the waves of FIG. 3 are believed to be attributable to the inductor. The values of voltages $V_1$ and $V_2$ are given. It is found that the circuit starts oscillating when the votage $V_1$ is made less than 6.5 volts with a voltage $V_2=-15$ volts. It is also clear that the circuit of FIG. 1 with a resistor-inductor delay line can be made to operate monostably or as a gated oscillator in a manner similar to that already discussed. For example, if $V_1$ is maintained at $+8$ volts, a negative input pulse of proper amplitude and short duration will cause a monostable output pulse. This same pulse of long duration will produce continuous oscillations for the pulse duration.

The monostable operation of the circuit of FIG. 1 is useful in logic circuits. In this type of operation, an input pulse switches the tunnel diode to its high state and, upon removal of the input level, the tunnel diode switches back to its low state. The circuit exhibits current threshold properties at its input and its output voltage levels are determined by the voltage $-V_2$ in one case (when the transistor is in its off state) and the level of conduction through the transistor in the other case. For example, the output voltage level is close to ground when the input conditions are such that the transistor saturates. As another example, if the knee of the transistor input current versus voltage characteristic falls within the valley of the tunnel diode characteristic, the output voltage is related to the input current when the tunnel diode switches to its high state.

The presence of delay in the feedback circuit (for example, the delay due to series inductance) improves the switching times of the circuit. Even without such delay, i.e., with only resistive feedback, the circuit of FIG. 1 is useful for high speed logic operation. The negative feedback increases the frequency response of the transistor at the expense of logical gain. The tunnel diode, however, provides the current threshold for the inputs, and, as explained above, helps in establishing the output voltage levels.

The circuit of FIG. 1 employing either one of the delay lines shown can also be operated bistably. Here, the tunnel diode, once switched to the high voltage state, remains there. This type of operation corresponds to that of a temporary storage circuit. The circuit is set by a negative input pulse and may be reset by a postive input pulse of the same amplitude. The main parameter which must be adjusted is the resistance of the delay circuit. The value of this resistance must be such that the current feedback from the collector to the tunnel diode, when the transistor conducts, is not large enough to drive the tunnel diode into the low voltage state.

Figure 8:
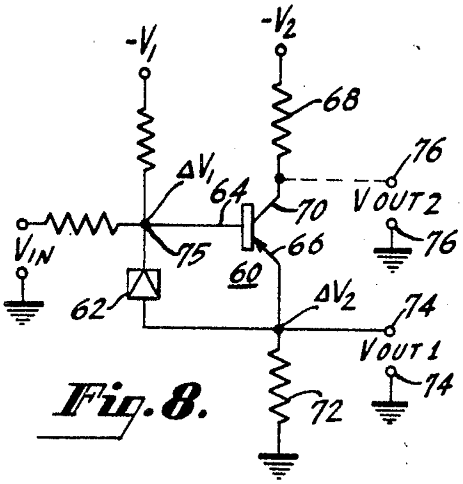
FIG. 8 is a schematic circuit diagram of one form of the present invention employing feedback from the emitter circuit.

The circuit shown in FIG. 8 includes feedback from the emitter-to-base rather than from collector-to-base. The circuit includes a transistor 60 and a tunnel diode 62 connected across the base 64 to emitter 66 diode of the transistor. Operating voltage is applied from source $-V_2$ through resistor 68 to the collector 70 of the transistor. An impedance such as resistor 72 is connected between the emitter 66 and ground.

The circuit of FIG. 8 may be operated as an emitter follower in which case the output is taken from terminals 74. An important advantage of this circuit so operated is that it is found to have both current and voltage gain. Voltage gain is obtained in the sense that $\Delta V_{in}$, the change in voltage at the input produces a larger corresponding change $\Delta V_1$ and $\Delta V_2$ appearing, respectively, at the terminals 76 and 74.

The circuit of FIG. 8 has important advantages over prior art emitter followers. In the prior art, emitter followers have been used in high speed logic circuits. However, they could not be cascaded indefinitely as each cathode follower stage introduced some voltage attenuation. The circuit of FIG. 8 can be cascaded as there is voltage gain at each stage. The circuit of FIG. 8 does not require voltage reshaping every second stage or so as in the case of prior art emitter follower transistor logic.

Figure 11:
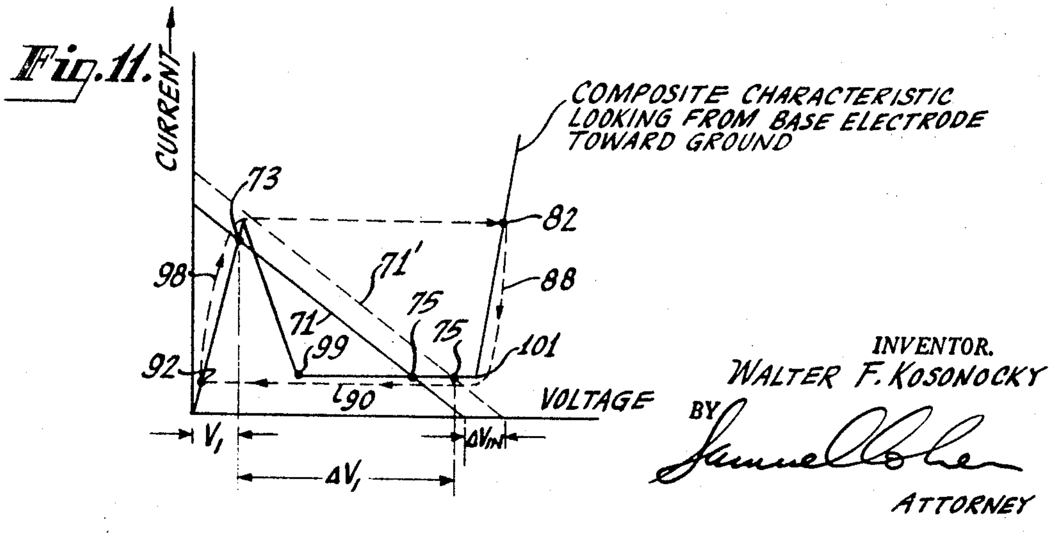
FIG. 11 is a characteristic curve of current versus voltage to help explain the operation of the circuit of FIG. 9.

The characteristic of current versus voltage for the circuit of FIG. 8 is shown in FIG. 11. An explanation of this characteristic is given later. However, it might be mentioned here that this characteristic is a fairly ideal negative resistance device characteristic as its parameters are adjustable and it can be employed in many wave shaping circuits. The extent of the valley region of the characteristic can be controlled by the saturation point of the transistor which, in turn, can be controlled by the value of resistor 68 or voltage $-V_2$. The valley region may be made to extend over a considerable voltage range. For example, the valley region may extend over a range of 10 volts or more.

The load line provided by source $-V_1$ and resistor 69 is shown by solid line 71 in FIG. 11. The quiescent circuit operating point in the low state of the tunnel diode is at 73. The shifted load line in response to an input signal $\Delta V_{in}$ is shown by dashed lines 71'. The parameters $V_1$, $\Delta V_{in}$, and $\Delta V_1$ are indicated.

The output of the circuit of FIG. 8 may be taken from the collector 70 as indicated by the dashed line and terminal 76 rather than from the emitter. It is also possible to employ both output terminals 76 and 74 for obtaining complementary output voltages.

With the load line shown at 71, the circuit of FIG. 8 operates bistably. When the tunnel diode is in its low voltage state, transistor 60 is cut off, and when the tunnel diode is in its high voltage state, the transistor conducts substantial current. The circuit of FIG. 8 can also be operated monostably by employing a constant voltage source for quiescently biasing the tunnel diode. This source may include an inductor between the $-V_1$ terminal and terminal 75.

Figure 9:
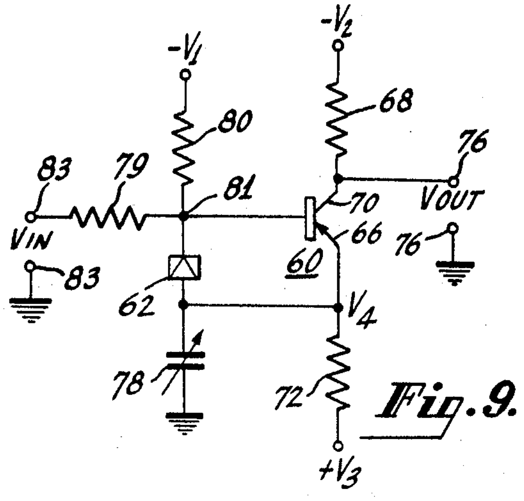
FIG. 9 is a schematic circuit diagram of another form of the invention employing feedback from the emitter circuit.

The circuit of FIG. 9 is in some respects similar to the one of FIG. 8 and corresponding elements are legended with the same reference numerals. The circuit of FIG. 9 includes, in addition, a capacitor 78 connected between the anode of the tunnel diode 62 and ground. This capacitor may be fixed or it may be variable, as shown. A source $-V_1$ supplies a quiescent forward bias current to the tunnel diode through resistor 80. A source $+V_3$ is connected through resistor 72 to the emitter 66.

Figure 10:
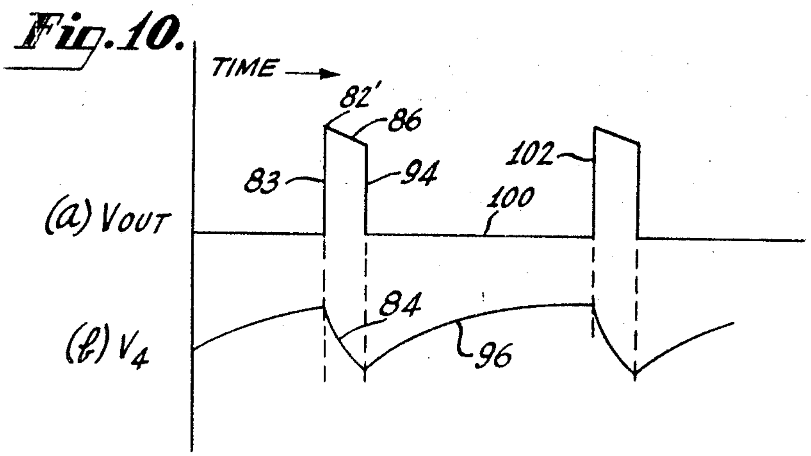
FIG. 10 is a drawing of waveforms present at various points in the circuit of FIG. 9.

The circuit of FIG. 9 can operate monostably, bistably or astably. The circuit operation as an astable oscillator may be better understood by referring to FIGS. 10 and 11. FIG. 10*a* illustrates the output rectangular wave which is produced by the circuit; FIG. 10*b* is the corresponding charge and discharge of the capacitor 78. When operated astably, no signal need be applied to the input terminals 83 and resistor 79 may be removed from the circuit. Alternatively, a 50 or more ohm resistor may be connected across terminals 83.

In the operation depicted in FIG. 10, when the voltages $-V_1$, $-V_2$ and $+V_3$ are initially turned on, the tunnel diode 62 switches to its high state. The circuit operating point is then at 82 in FIG. 11. The switching of the tunnel diode to its high state causes a sharp increase in voltage across the emitter-to-base diode of the transistor and the latter is driven into saturation. The voltage at the collector 70 available at output terminals 76 increases from its former negative value to one close to ground. This sharp increase in voltage is illustrated at 83 in FIG. 10 and the operating point 82 of FIG. 11 is illustrated at 82' in FIG. 10.

When the transistor is driven into saturation, the capacitor 78 begins to discharge from a positive value to a less positive value with reference to ground. The capacitor discharge is shown at 84 in FIG. 10. The capacitor is connected to the emitter 66 and the emitter is accordingly driven less positive and the current passing through the transistor decreases. This results in a decrease in voltage at output terminals 76 and corresponds to the portion 86 of the wave as shown in FIG. 10*a*. The capacitor discharge also corresponds to a change in the circuit operating point from 82 to a lower current value as indicated by dashed line 88.

When the voltage $V_4$ reduces to a value below that which will permit sufficient current flow through the tunnel diode to support operation of the tunnel diode in its high state, the tunnel diode switches to its low voltage state. The switching of the tunnel diode is shown by dashed line 90 and the new operating point is at 92.

When the tunnel diode switches to is low state, the emitter-to-base voltage of the transistor decreases to a value below that which will support current flow through the transistor. Accordingly, the transistor is driven to cut off. This is shown at portion 94 of the wave of FIG. 10. Now the capacitor 78 begins again to charge toward the value $+V_3$ as is indicated by portion 96 of the curve shown in FIG. 10*b*. The current flowing through the tunnel diode 62 increases as is indicated by dashed line 98. Shortly, the current peak of the tunnel diode is exceeded and the tunnel diode switches to its high voltage state.

When the transistor is cut-off, the voltage across the output terminals 76 goes negative to a value substantially equal to $-V_2$. This is indicated at 100 in FIG. 10. The subsequent switching of the tunnel diode back to its high voltage state and the turn-on of the transistor is indicated at 102.

The characteristic curve of current versus voltage shown in FIG. 11 is one actually observed on an oscilloscope screen for the circuit of FIG. 9 less the capacitor 78 and resistors 79 and 80, and with voltage and current between ground and node 81. The straight rather than curved lines corresponding to the high and low states of the diode is due mainly to the resistance of resistor 72. The positive resistance regions in the low and high voltage states occur when the transistor is not in the active region (is operating without gain). The low voltage state corresponds to the transistor cut off and the high voltage state to transistor saturation. With the transistor cut-off, the low voltage resistance of the tunnel diode plus the resistance 72 determines the slope of the low voltage state of the characteristic of FIG. 11. In the region 101, 82 of the curve, the transistor is in saturation. During this period a substantial input current flows through the base-to-emitter junction of the transistor and into the resistance 72. Accordingly, the high voltage positive resistance region of the characteristic is due mainly to the resistance of the base-to-emitter diode of the saturated transistor in series with the resistance 72.

The valley region 99, 101 of the characteristic of FIG. 11 occurs when the transistor is in its active region. Here, the base current is $(1-\alpha)\ I_e$, where $\alpha$ is the current gain of the transistor and $I_e$ is its emitter current. This means that a very small input current I produces a current $I/1-\alpha$ in resistance 72. The slightly negative slope in the valley region observed with a gallium arsenide tunnel diode in the circuit of FIG. 8 is believed to be due to the negative resistance of the tunnel diode in this region. The valley region 99–101 in FIG. 11 may be 10 or more volts.

The voltage swing of the valley region 99–101 is limited only by the maximum voltage setting of the transistor. In the absence of capacitance 78 (FIG. 9) the output of the circuit can be determined by considering the curve of FIG. 11, the circuit load line and the various voltages in the circuit. The magnitude of the output voltage at the emitter, when the tunnel diode is in its high state, corresponds to the voltage at the intersection of the load line and the characteristic curve (for example, the voltage at 75 or 75′ in FIG. 11) less the voltage across the tunnel diode. The internal impedance of the circuit providing this output voltage (the voltage at output terminals 74), however, is the output impedance of the emitter follower.

As in the circuit of FIG. 1, various means are possible for varying the output frequency of the circuit of FIG. 9 when the circuit is operated astably. It is found that as $+V_3$ is increased the operating frequency is increased. It is found that as $-V_1$ is made more negative, the operating frequency is increased. The frequency can also be changed by varying the values of resistors or varying the capacitor 78.

As already mentioned, the circuit of FIG. 9 can be operated monostably, bistably or astably. The operating mode of the circuit can be deduced from the characteristic of FIG. 11. The capacitance 78 of FIG. 9 modifies the operation of the circuit by delaying the effect of the emitter feedback action.

A typical circuit according to FIG. 9 may have the following circuit values:

Resistor 80—1,800 ohms
Resistor 68—220 ohms
Resistor 79—1,000 ohms
Resistor 72—220 ohms
Capacitor 78—.001 microfarad, gallium arsenide, 5 milliampere peak. (Other tunnel diodes may be used instead such as germanium or silicon.)
Transistor 60—GF 40025
$-V_1$——17 volts
$-V_2$——12 volts
$V_3$—+4 volts The circuits shown employ PNP transistors. It is to be understood that NPN transistors may be used instead provided the power supply voltages are changed and the tunnel diode is connected at its anode to the base and at its cathode to the emitter.

What is claimed is:

1. A circuit comprising a transistor having emitter, base and collector electrodes; a negative resistance diode of the voltage controlled type connected in shunt with the emitter-to-base diode of the transistor in a sense to maintain the transistor cut-off when in its low state and to drive the transistor into conduction when in its high state; and a direct current feedback circuit including reactive means for delaying the effect of the feedback connecting one of the emitter and collector electrodes to said negative resistance diode for applying a delayed feedback voltage to said negative resistance diode for switching the latter to its low voltage state when the transistor is driven into conduction.

2. A circuit comprising a transistor having emitter, base and collector electrodes; a negative resistance diode of the voltage controlled type connected in shunt with the emitter-to-base diode of the transistor in a sense to maintain the transistor cut-off when in its low state and to drive the transistor into conduction when in its high state; and a degenerative direct current feedback circuit connected to apply a feedback voltage developed at said emitter electrode to said negative resistance diode for switching the latter to its low voltage state when the transistor is driven into conduction.

3. A circuit comprising a transistor having emitter, base and collector electrodes; a negative resistance diode of the voltage controlled type connected in shunt with the emitter-to-base diode of the transistor in a sense to maintain the transistor cut-off when in its low state and to drive the transistor into conduction when in its high state; and a degenerative direct current feedback circuit including a charge storage element connected between said emitter electrode and a point of reference potential for applying a feedback voltage developed at said emitter electrode to said negative resistance diode for switching the latter to its low voltage state when the transistor is driven into conduction.

4. A circuit comprising a transistor having emitter, base and collector electrodes; a negative resistance diode of the voltage controlled type connected in shunt with the emitter-to-base diode of the transistor in a sense to maintain the transistor cut off when in its low state and to drive the transistor into conduction when in its high state; source means supplying an operating voltage between the emitter and collector electrodes of said transistor; and a degenerative feedback circuit including a charge storage element effectively in shunt with a resistor connected between said emitter electrode and a point of reference potential and connected to apply a feedback voltage developed at said emitter electrode to said negative resistance diode for switching the latter to its low voltage state when the transistor is driven into conduction.

5. A circuit comprising a transistor having emitter, base and collector electrodes; a tunnel diode connected in shunt with the emitter-to-base diode of the transistor in a sense to maintain the transistor cut off when in its low state and to drive the transistor into conduction when in its high state; source means for applying an operating voltage to said transistor; a feedback circuit for said tunnel diode comprising a resistor connected between said emitter electrode and one terminal of said source means and a capacitor connected between said emitter electrode and ground; source means for supplying an operating voltage to said transistor; and source means for applying a forward bias current to said tunnel diode at a level to place said tunnel diode in its high state.

6. In combination, a transistor having emitter, base and collector electrodes; a negative resistance diode of the voltage controlled type connected across the emitter-to-base diode of the transistor; means for applying an operating voltage to the transistor; and a feedback connection comprising a delay means coupled between the collector and base electrodes of the transistor.

7. In combination, a transistor having emitter, base and collector electrodes; a negative resistance diode of the voltage controlled type connected across the emitter-to-base diode of the transistor; means for applying an operating voltage to the transistor; and a feedback connection comprising a resistor-capacitor delay line coupled between the collector and base electrodes of the transistor.

8. In combination, a transistor having emitter, base and collector electrodes; a negative resistance diode of the voltage controlled type connected across the emitter-to-base diode of the transistor; means for applying an operating voltage to the transistor; and a feedback connection comprising a resistor-inductor delay line coupled between the collector and base electrodes of the transistor.

9. In combination, a transistor having emitter, base and collector electrodes; a tunnel diode connected across the emitter-to-base diode of the transistor in a sense to maintain th transistor cut off when in its low voltage state and to cause the transistor to conduct when in its high voltage state; means for applying an operating voltage to the transistor; and a delay line connected between the collector electrode and the tunnel diode for applying a feedback voltage to the tunnel diode in a sense to switch the tunnel diode to its low voltage state.

10. In combination, a transistor having emitter base and collector electrodes; a tunnel diode connected across the emitter-to-base diode of the transistor in a sense to maintain the transistor cut off when in its low voltage state and to cause the transistor to conduct when in its high voltage state; means coupled at one terminal to said emitter electrode and at another terminal to said collector electrode for applying an operating voltage to the transistor; and a resistor connected between the emitter electrode of the transistor and a terminal of said last-named means for applying a feedback voltage developed across said resistor to the tunnel diode in a sense to switch the tunnel diode to its low voltage state.

11. A rectangular wave oscillator comprising a transistor having base, emitter and collector electrodes; a negative resistance diode of the voltage controlled type connected in shunt with the emitter-to-base diode of the transistor and poled in the same direction as said emitter-to-base diode; means for applying operating voltages to the transistor; means for quiescently biasing said negative resistance diode to one of its two voltage states; and a direct current feedback circuit between one of the emitter and collector electrodes of said transistor and said negative resistance diode for applying a delayed feedback voltage to said negative resistance diode, when the transistor is driven into conduction, which switches said negative resistance diode to its lower voltage state whereby the transistor is cut off and, in response to the cutting off of the transistor, which applies a delayed feedback voltage to the negative resistance diode which switches the diode to its higher voltage state, whereby the transistor is driven into conduction.

12. A rectangular wave oscillator comprising a transistor having base, emitter and collector electrodes; a negative resistance diode of the voltage controlled type connected in shunt with the emitter-to-base diode of the transistor and poled in the same direction as said emitter-to-base diode; means for applying an operating voltage to the transistor; means for quiescently biasing said negative resistance diode to the higher of its two voltage states, whereby the transistor is driven into conduction; and a feedback circuit between one of the emitter and collector electrodes of said transistor and said negative resistance diode for applying a delayed, degenerative feedback voltage to said negative resistance diode, when said transistor conducts, at an amplitude to switch said negative resistance diode to the lower of its two voltage states, whereby said transistor is driven to cut-off and when said transistor is cut off, at an amplitude to switch said negative resistance diode to the higher of its voltage states, whereby said transistor is rendered conductive.

13. A rectangular wave producing circuit comprising a transistor having base, emitter and collector electrodes; a negative resistance diode of the voltage controlled type connected in shunt with the emitter-to-base diode of the transistor and poled in the same direction as said emitter-to-base diode; means coupled at one terminal to said emitter electrode and at another terminal to said collector electrode for applying an operating voltage to the transistor; means for initially quiescently biasing said negative resistance diode to the higher of its two voltage states, whereby the transistor is driven into conduction; and a feedback circuit including a resistor connected between the emitter electrode and one terminal of said source and a capacitor effectively in shunt with the resistor for applying a degenerative feedback voltage to said negative resistance diode, when said transistor conducts, at an amplitude to switch said negative resistance diode to the lower of its two voltage states, whereby said transistor is driven to cut-off.

14. A circuit comprising a transistor having emitter, base and collector electrodes; a negative resistance diode of the voltage-controlled type connected in shunt with the emitter-to-base diode of the transistor in a sense to maintain the transistor cut off when in its low state and to drive the transistor into conduction when in its high state; and a degenerative feedback circuit connected to apply a feedback voltage developed at said emitter electrode to the electrode of the negative resistance diode connected to the emitter electrode for switching the negative resistance diode to its low voltage state when the transistor is driven into conduction.

15. A circuit comprising a transistor having emitter, base and collector electrodes; a tunnel diode coupled at one electrode to the base electrode of the transistor and at its other electrode to the emitter electrode of the transistor in a sense to maintain the transistor cut off when in its low state and to drive the transistor into conduction when in its high state; and a degenerative direct current feedback circuit connected to apply a feedback voltage developed at said emitter electrode to the electrode of the tunnel diode connected to said emitter electrode in a sense to tend to switch the tunnel diode to its low voltage state when the transistor is driven into conduction and in a sense to tend to switch the tunnel diode to its high voltage state when the transistor is driven towards cut-off.

16. A circuit comprising a transistor having emitter, base and collector electrodes; a tunnel diode coupled at one electrode to the base electrode of the transistor and at its other electrode to the emitter electrode of the transistor in a sense to maintain the transistor cut off when in its low state and to drive the transistor into conduction when in its high state; and a degenerative direct current feedback circuit, including a reactive element for delaying the effect of the feedback, connected to apply a feedback voltage developed at said emitter electrode to the electrode of the tunnel diode connected to said emitter electrode in a sense to tend to switch the tunnel diode to its low voltage state when the transistor is driven into conduction and in a sense to tend to switch the tunnel diode to its high voltage state when the transistor is driven towards cut-off.

References Cited

UNITED STATES PATENTS

| | | | |
|---|---|---|---|
| 3,094,630 | 6/1963 | Rapp et al. | 307—88.5 |
| 3,102,209 | 8/1963 | Pressman | 307—88.5 |

OTHER REFERENCES

Article "Tunnel Diodes Applications" by Carl Todd. Hughes application, Engr. Notes, Hughes Semiconductor Div., Newport Beach, Calif., 8 pp., May 1960.

Article "Tunnel Diodes as Amplifiers and Switches" by Sylvan and Gottliebe. Reprint of May 1960 Electronic Equipment Engr., 7 pp.

Tunnel Diode Manual by General Electric, Mar. 20, 1961, pp. 46–49, Mar. 20, 1961.

JOHN S. HEYMAN, Primary Examiner

JOHN ZAZWORSKY, Assistant Examiner

U.S. Cl. X.R.

307—274, 276; 331—107